United States Patent
Takayama (10) Patent No.: US 8,587,820 B2
(45) Date of Patent: Nov. 19, 2013

(54) TAPE PRINTING APPARATUS, PARAGRAPH ARRANGEMENT DECIDING METHOD FOR TAPE PRINTING APPARATUS, AND PROGRAM FOR SAME

(75) Inventor: Shoji Takayama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 13/045,670

(22) Filed: Mar. 11, 2011

(65) Prior Publication Data

US 2011/0236114 A1  Sep. 29, 2011

(30) Foreign Application Priority Data

Mar. 23, 2010 (JP) ................................. 2010-065868

(51) Int. Cl.
  *G06K 15/00* (2006.01)
(52) U.S. Cl.
  USPC ........................................................ 358/1.18
(58) Field of Classification Search
  USPC .......................... 358/1.9; 347/191; 400/61, 83
  See application file for complete search history.

(56) References Cited

U.S. PATENT DOCUMENTS

| | | | |
|---|---|---|---|
| 5,868,504 A * | 2/1999 | Nunokawa et al. | 400/61 |
| 5,868,505 A | 2/1999 | Narushima et al. | |
| 6,491,454 B1 * | 12/2002 | Toyosawa et al. | 400/83 |
| 2004/0196353 A1 * | 10/2004 | Hosokawa et al. | 347/191 |
| 2008/0198394 A1 * | 8/2008 | Hamada et al. | 358/1.9 |

OTHER PUBLICATIONS

Jim King; User's Manual of "TEPRA" PRO SR930. Jul. 2009, Third Edition, pp. 55, 56, 78 to 82.

* cited by examiner

*Primary Examiner* — Tammy Pham
*Assistant Examiner* — Bharatkumar Shah
(74) *Attorney, Agent, or Firm* — ALG Intellectual Property, LLC (57) ABSTRACT

A tape printing apparatus capable of printing plural paragraphs arrayed in a longitudinal direction of a tape, with each paragraph including one or more lines includes: a paragraph creating unit which creates the paragraphs; a feeding quantity setting unit which set a quantity of feeding between the paragraphs in the longitudinal direction of the tape; an arrangement deciding unit which decides an arrangement of each paragraph on the basis of the setting by the feeding quantity setting unit; and a printing unit which prints each paragraph created by the paragraph creating unit on the tape in a manner that realizes the arrangement decided by the arrangement deciding unit.

8 Claims, 6 Drawing Sheets

TAPE PRINTING APPARATUS, PARAGRAPH ARRANGEMENT DECIDING METHOD FOR TAPE PRINTING APPARATUS, AND PROGRAM FOR SAME

BACKGROUND

1. Technical Field

The present invention relates to a tape printing apparatus that can print plural paragraphs arrayed in the longitudinal direction of a tape, with each paragraph including one or more lines, a paragraph arrangement deciding method for the tape printing apparatus, and a program for the same.

2. Related Art

Traditionally, a tape printing apparatus of this kind can provide several paragraphs on one label and thus can provide different numbers of lines or change design for each paragraph, for example, as described in the User's Manual of "TEPRA" PRO SR930 by KING JIM, July 2009, Third Edition, pages 55, 56, 78 to 82. However, the number of lines within one paragraph is fixed. Within one paragraph, documents including different numbers of lines cannot exist and one line cannot be increased to two lines from a halfway part, either.

For the above reason, because of the low degree of freedom for arrangement in the traditional tape printing apparatus, the user cannot necessarily acquire a desired result though the user intends to create label having variety by using paragraph functions. The quantity of feeding between paragraphs (the length between paragraphs) in the longitudinal direction of the tape is uniform (for example, 0.5 mm) and therefore the arrangement of paragraphs cannot be freely set.

SUMMARY

An advantage of some aspects of the invention is that a tape printing apparatus having a high degree of freedom for the arrangement of paragraphs on a tape, a paragraph arrangement deciding method for the tape printing apparatus, and a program for the same can be provided.

According to an aspect of the invention, there is provided a tape printing apparatus capable of printing plural paragraphs arrayed in a longitudinal direction of a tape, with each paragraph including one or more lines. The apparatus includes: a paragraph creating unit which creates the paragraphs; a feeding quantity setting unit which set a quantity of feeding between the paragraphs in the longitudinal direction of the tape; an arrangement deciding unit which decides an arrangement of each paragraph on the basis of the setting by the feeding quantity setting unit; and a printing unit which prints each paragraph created by the paragraph creating unit on the tape in a manner that realizes the arrangement decided by the arrangement deciding unit.

According to another aspect of the invention, there is provided a paragraph arrangement deciding method for a tape printing apparatus capable of printing plural paragraphs arrayed in a longitudinal direction of a tape, with each paragraph including one or more lines. The method includes allowing the tape printing apparatus to: create the paragraphs; set a quantity of feeding between the paragraphs in the longitudinal direction of the tape; and decide an arrangement of each paragraph on the basis of the quantity of feeding that is set.

With these configurations, the quantity of feeding between paragraphs can be set and therefore the degree of freedom for the arrangement of each paragraph on the tape can be enhanced. Thus, a label having variety can be created and hence the user can acquire a desired result.

In the tape printing apparatus, it is preferable that the feeding quantity setting unit can set the quantity of feeding for each paragraph.

With this configuration, a label having further variety with different quantities of feeding for individual paragraphs can be created.

The quantity of feeding set for an arbitrary paragraph is the length between the arbitrary paragraph and the paragraph that is immediately before or immediately after the arbitrary paragraph.

In the tape printing apparatus, it is also preferable that the quantity of feeding can be set at a negative value, and in the case where the quantity of feeding is set at a negative value, the arrangement deciding unit decides the arrangement of the arbitrary paragraph in a manner that the arbitrary paragraph is superimposed on at least one paragraph of one or more paragraphs that are created before that paragraph.

With this configuration, it is possible to create a label on which two or more paragraphs are superimposed and combined, by setting the quantity of feeding at a negative value.

The superimposition of two or more paragraphs includes not only the superimposition of the entire paragraphs but also the superimposition of a part of the paragraphs. It is assumed that the paragraph that is superimposed (the forward side or upper side) is transmissive in its ground part, excluding characters.

In the tape printing apparatus, it is also preferable that the feeding quantity setting unit can set the quantity of feeding by selecting one of plural options, and the options include a first option to align and superimpose a starting position of the arbitrary paragraph to a starting position of a paragraph that is created immediately before that paragraph.

With this configuration, it is possible to set the quantity of feeding easily by selecting one of the plural options. Since the options include the first option to align and superimpose the starting position of the arbitrary paragraph to the starting position of the paragraph that is created immediately before that paragraph, the arbitrary paragraph and the paragraph that is created immediately before that paragraph can be easily combined without requiring the user to do work such as calculating the quantity of feeding.

In the tape printing apparatus, it is also preferable that the options include a second option to arrange the starting position of the arbitrary paragraph at a position that is away by a predetermined amount from a starting position or an ending position of a paragraph that is created immediately before that paragraph.

With this configuration, since the options include the second option to arrange the starting position of the arbitrary paragraph at a position that is away by a predetermined amount from the starting position or the ending position of the paragraph that is created immediately before that paragraph, each paragraph can be arranged at equal spacing in the longitudinal direction of the tape and a label with good appearance can be created.

In the tape printing apparatus, it is also preferable that the feeding quantity setting unit can set the quantity of feeding in one of millimeters, inches, the number of dots, and the number of characters.

With this configuration, in the case where the quantity of feeding can be set in millimeters, inches or the number of dots, paragraph spacing on the result (tape) can be easily estimated. In the case where the quantity of feeding can be set in the number of characters, the setting for the case of superimposing and combining two paragraphs can be easily carried out.

The number of characters may be the number of fullwidth characters or the number of halfwidth characters. The setting of the quantity of feeding can also include the setting of character size. For example, the setting of one fullwidth character with a character size "large", four halfwidth characters with a character size "medium", and so on can be considered.

In the tape printing apparatus, it is also preferable that each paragraph created by the paragraph creating unit has a uniform length in a direction of width of the tape after printing.

With this configuration, since each paragraph has a uniform length in the direction of the width of the tape after printing, the appearance can be improved in the case where plural paragraphs are arrayed in the longitudinal direction of the tape (including the case where the paragraphs are superimposed and combined).

According to still another aspect of the invention, there is provided a program causing a computer to execute each operation of the paragraph arrangement deciding method for the tape printing apparatus.

Using this program, a paragraph arrangement deciding method for a tape printing apparatus with a high degree of freedom for paragraph arrangement on a tape can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
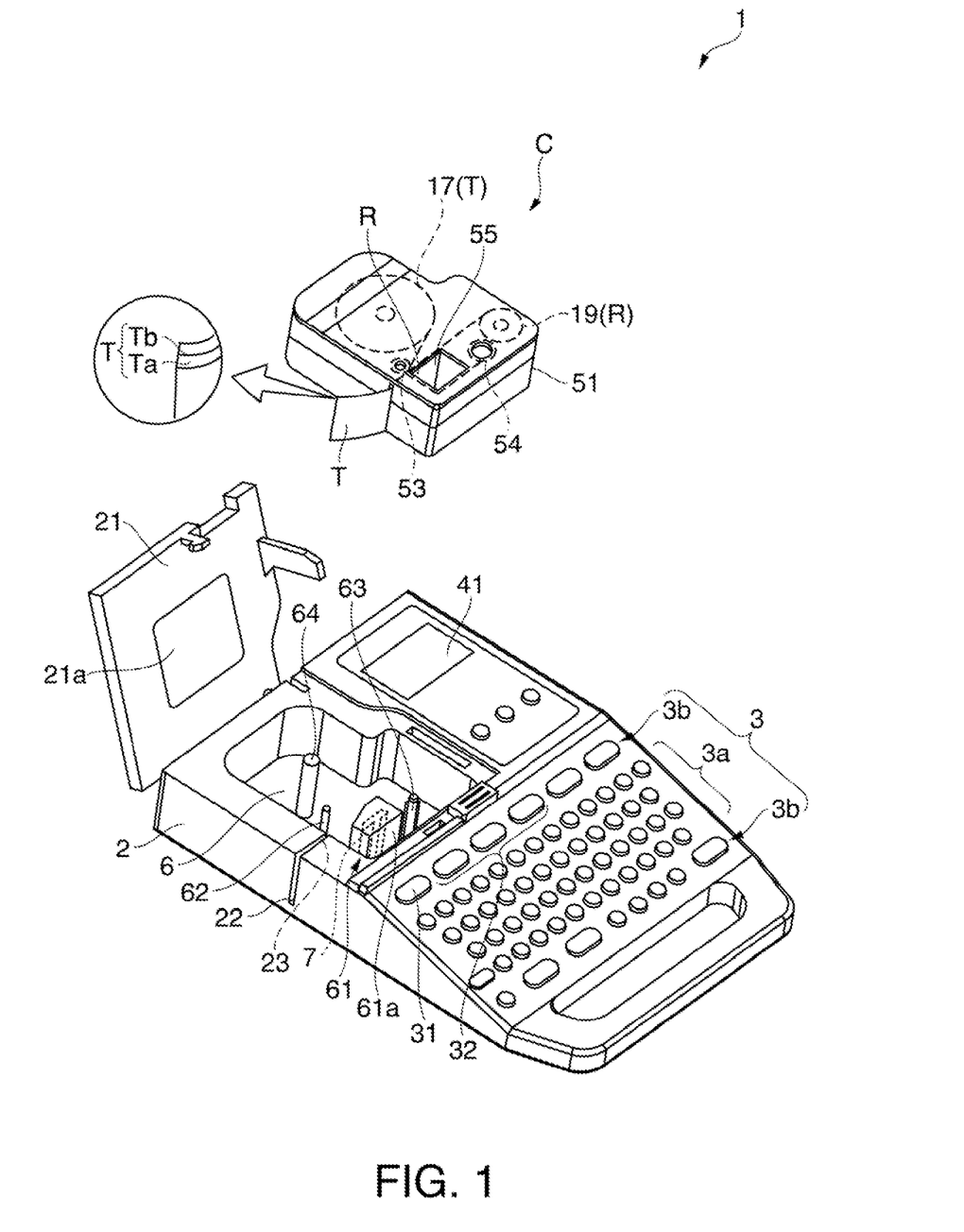
FIG. 1 is a perspective view showing the appearance of a tape printing apparatus according to an embodiment of the invention.

Hereinafter, an embodiment of the invention will be described with reference to the accompanying drawings. FIG. 1 is a perspective view showing the appearance of a tape printing apparatus 1 according to this embodiment, with its open/close cover 21 opened. As shown in FIG. 1, the contour of the tape printing apparatus 1 is formed by an apparatus case 2. A keyboard 3 having various input keys is arranged on the top side of a front part of the apparatus case 2. The open/close cover 21 is attached to a left part on the top side of a rear part. A display screen 41 is arranged to the right of the open/close cover 21. Inside the open/close cover 21, a cartridge loading section 6 for loading a tape cartridge C is formed as a recess. The tape cartridge C is removably loaded in the cartridge loading section 6 in the state where the open/close cover 21 is opened. In the open/close cover 21, a viewing window 21a is formed which allows visual recognition of loading or non-loading of the tape cartridge C in the state where the open/close cover 21 is closed.

A character key group 3a, and a function key group 3b to designate various operation modes or the like are arranged on the keyboard 3. The character key group 3a has a full key configuration based on the JIS arrangement. The character key group 3a is similar to the key configuration of a general word processor, including a shift key for restraining increase in the number of keys to be operated. The function key group 3b includes a "print" key, "cursor" keys, a "select" key, a "delete" key, and an "edit" key.

The "print" key is a key for designating the execution of printing. The "cursor" keys include up, down, left and right keys ("↑", "↓", "←", "→"). These keys are for cursor movement and scrolling. The "select" key is a key for selecting and finalizing an option. The "delete" key is a key for deleting (or erasing) a character. The "edit" key is a key for setting a character mode, setting a paragraph style, setting a text format, and the like. A "paragraph" refers to an "aggregate of lines (or one line)" printed in a way that these lines are stacked to the tape width. A "text" refers to all the paragraphs, all the lines and all the characters printed on one label L (see FIG. 4C). That is, the size of each unit is in ascending order of "character<line<paragraph<text".

The display screen 41 is a liquid crystal display and is used by the user when confirming an editing result based on input information inputted via the keyboard 3 and print data or the like generated on the basis of the editing result.

A tape discharge port 22 connecting the cartridge loading section 6 to outside is formed at a left-side part of the apparatus case 2. In the tape discharge port 22, a tape cutter 23 for cutting a tape T that is sent out exists. The tape T that is already printed is sent out by a predetermined length from the tape discharge port 22. In the state where the sending of the tape is temporarily stopped, the printed tape T is cut by the tape cutter 23. Thus, a stripe-like label L is created (see FIG. 4C). For the cutting processing, whether to drive a cut motor 25 (see FIG. 2) can be set according to the option to "carry out" or "not to carry out" automatic cutting.

In the cartridge loading section 6, a head unit 61 having a thermal print head 7 built in a head cover 61a, a platen drive shaft 62 facing the print head 7, a reel-in drive shaft 63 which reels in an ink ribbon R, which will be described later, and a positioning protrusion 64 for a tape reel 17, which will be described later, are provided. A tape feeding motor 26 (see FIG. 2) which rotates the platen drive shaft 62 and the reel-in drive shaft 63 is built in a part below the cartridge loading section 6.

The tape cartridge C houses a tape reel 17 on which the tape T with a predetermined width (approximately 4 to 48 mm) is wound, at a top central part within a cartridge case 51, and a ribbon reel 19 on which the ink ribbon R is wound, at a bottom right part. The tape T and the ink ribbon R have the same width. A through-hole 55 in which the head cover 61a covering the head unit 61 is to be inserted is formed at a left part below the tape reel 17. The head unit 61 inserted in the through-hole 55 and a platen roller 53 which is engaged with the platen drive shaft 62 and thus rotationally driven are arranged corresponding to the part where the tape T and the ink ribbon R overlap each other. Meanwhile, a ribbon reel-in reel 54 is arranged closely to the ribbon reel 19. The ink ribbon R reeled off from the ribbon reel 19 is arranged to surround the head cover 61a and becomes reeled in by the ribbon reel-in reel 54. That is, the ink ribbon R is wound on the ribbon reel-in reel 54 via a ribbon traveling path on the peripheral wall of the through-hole 55.

When the tape cartridge C is loaded in the cartridge loading section 6, the head cover 61*a* is inserted in the through-hole 55, the position protrusion 64 is inserted in the center hole of the tape reel 17, and the reel-in drive shaft 63 is inserted in the center hole of the ribbon reel-in reel 54. The print head 7 is abutted against the platen roller 53, with the tape T and the ink ribbon R nipped between the print head 7 and the platen roller 53. Thus, printing becomes available. After that, as the user inputs a desired text (characters including letters, numbers, symbols and simple patterns) or image via the keyboard 3 while confirming the result of editing on the display screen 41 and then presses the "print" key to designate printing, the tape printing apparatus 1 reels off the tape T from the tape cartridge C by the tape feeding motor 26 and causes a heat generating element of the print head 7 to selectively generate heat, thus performing desired printing on the tape T. The printed part of the tape T is sent outside, as required, from the tape discharge port 22. When the printing is completed, the tape feeding motor 26 feeds the tape T to a position where a tape length including a margin is obtained. After that, the tape feeding motor 26 stops the feeding (and then the apparatus shifts to cutting processing).

Meanwhile, the tape T includes a recording tape Ta having an adhesive layer formed on its back side, and a separation tape Tb pasted to the recording tape Ta by the adhesive layer. The tape T is wound in the shape of a roll with the recording tape Ta facing outside and the separation tape Tb facing inside, and is housed in the cartridge case 51. Different types of tapes T (with different tape widths, tape background colors, background patterns, materials and the like) are prepared. One of these types of tapes T (or ink ribbons R) is housed in each cartridge case 51. On the back side of the cartridge case 51, plural holes (not shown) to specify the type of the tape cartridge C are provided. In the cartridge loading section 6, plural tape identification sensors (micro-switches or the like) 27 (see FIG. 2) to detect the plural holes are provided corresponding to the plural holes. As the tape identification sensors 27 detect the state of the plural holes, the tape type can be determined.

Figure 2:
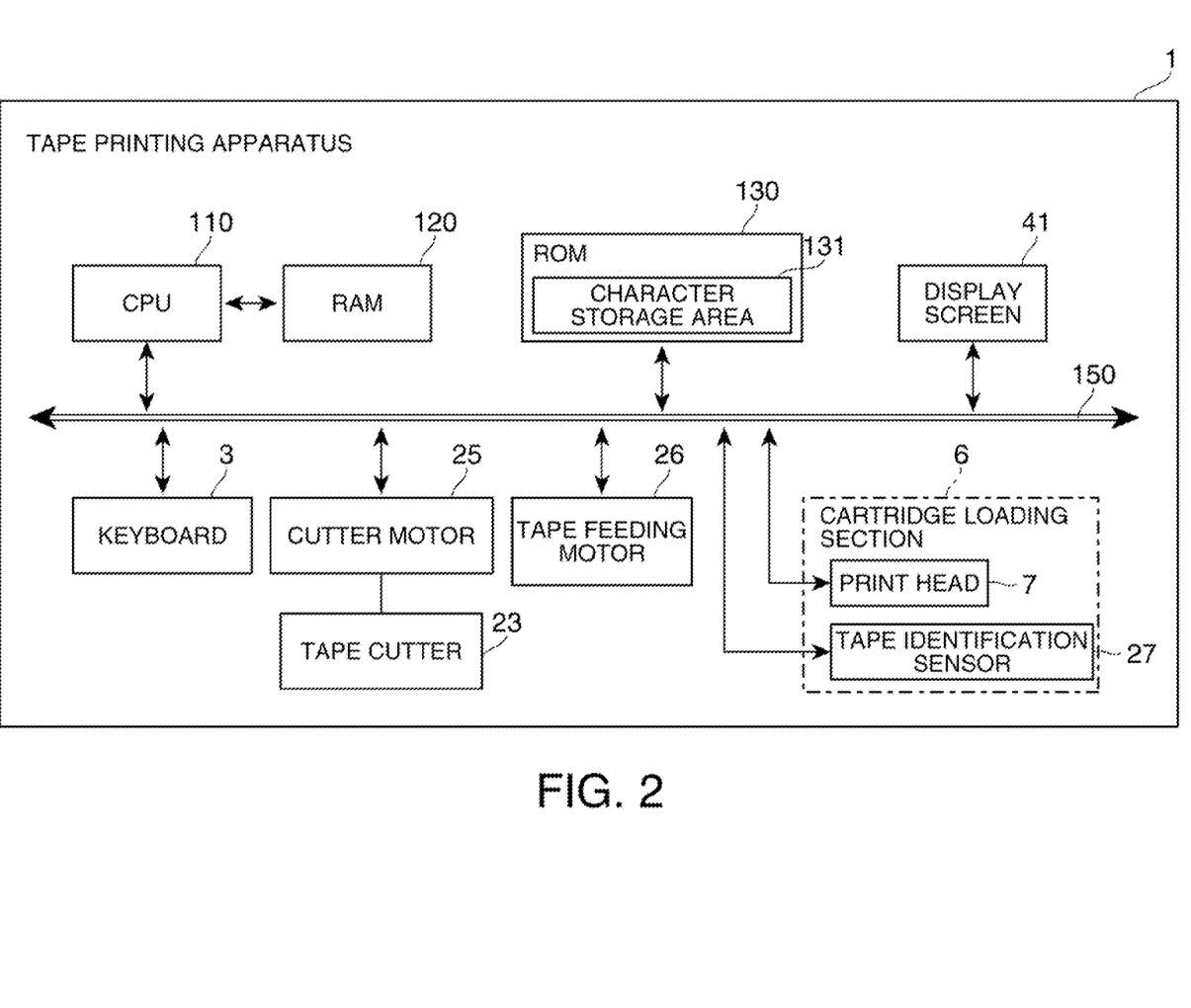
FIG. 2 is a control block diagram of the tape printing apparatus.

Next, the control configuration of the tape printing apparatus 1 will be described with reference to the control block diagram of FIG. 2. The tape printing apparatus 1 has a CPU (central processing unit) 110, a RAM (random access memory) 120, a ROM (read only memory) 130, the display screen 41, the keyboard 3, the cutter motor 25, the tape cutter 23, the tape feeding motor 26, the print head 7, and the tape identification sensors 27. These components are connected via a bus 150.

The RAM 120 is directly connected with the CPU 110 and is used as a work area when the CPU 110 carries out various kinds of control. The ROM 130 stores control programs and various kinds of information for carrying out various kinds of control. Specifically, as the control programs, a display control program to control the display on the display screen 41, a paragraph creation processing program to create a paragraph, a paragraph allocation decision processing program to decide the allocation of paragraphs, a print processing program to carry out print processing, and the like are stored (not shown). The ROM 130 also has a character storage area 131 in which many characters used for the display on the display screen 41 and the print on the tape T are stored.

The display screen 41 functions as a display unit to display the result of editing and print layout. The keyboard 3 functions as an input unit for the user to input information, an editing unit to carry out editing processing, a setting unit to carry out various kinds of setting, and the like.

The cutter motor 25 is connected with the tape cutter 23 and functions as a cutting unit. The tape feeding motor 26 and the print head 7 function as a printing unit to carry out printing on the tape T. As described above, the print head 7 and the tape identification sensors 27 are provided in the cartridge loading section 6. The tape identification sensors 27 detect the type of the tape T housed in the tape cartridge C. The CPU 110 controls the limitations to the number of lines and the number of characters that can be inputted as a text, the decision of the length in the direction of the tape width, of a print area E (see FIG. 4A-C or the like) representing an occupied area in the case where a paragraph is printed on the tape T, the determination of compatibility of the loaded tape cartridge C, and the like, on the basis of the result of detection by the tape identification sensors 27 (on the basis of the tape width and the like). The CPU 110 also controls the display processing on the display screen 41, the editing processing and the print processing.

Next, the operations from the creation of a paragraph to the decision of its allocation, and the result of creating print data and the result of printing based on these operations will be described with reference to FIG. 3 and FIG. 4A to FIG. 4C. The screen indicated by a reference symbol D01 (hereinafter referred to as "screen D") shows a text input screen in a state where no input is made yet. In the text input screen in the state where no input is made yet, a cursor K is added to a beginning-of-line mark indicated by an enclosed number. The beginning-of-line mark displayed in white (the number representing the line number displayed in black) means that no character is inputted in this and subsequent lines. The beginning-of-line mark displayed in black (the number representing the line number displayed in white) means that characters are inputted in this and subsequent lines (see D02 and the like). On the bottom side of the text input screen, there is a text display area showing inputted texts. On the top side of the text input screen, there is a print preview area. Moreover, at a top left part of the screen, there is a size display area showing the size of a label L to be produced. For example, in the example shown in FIG. 3, since no input is made yet, it is shown that the tape length is 0.0 mm and the tape width is 18 mm on the basis of the result of detection by the tape identification sensors 27**.

Figure 3:
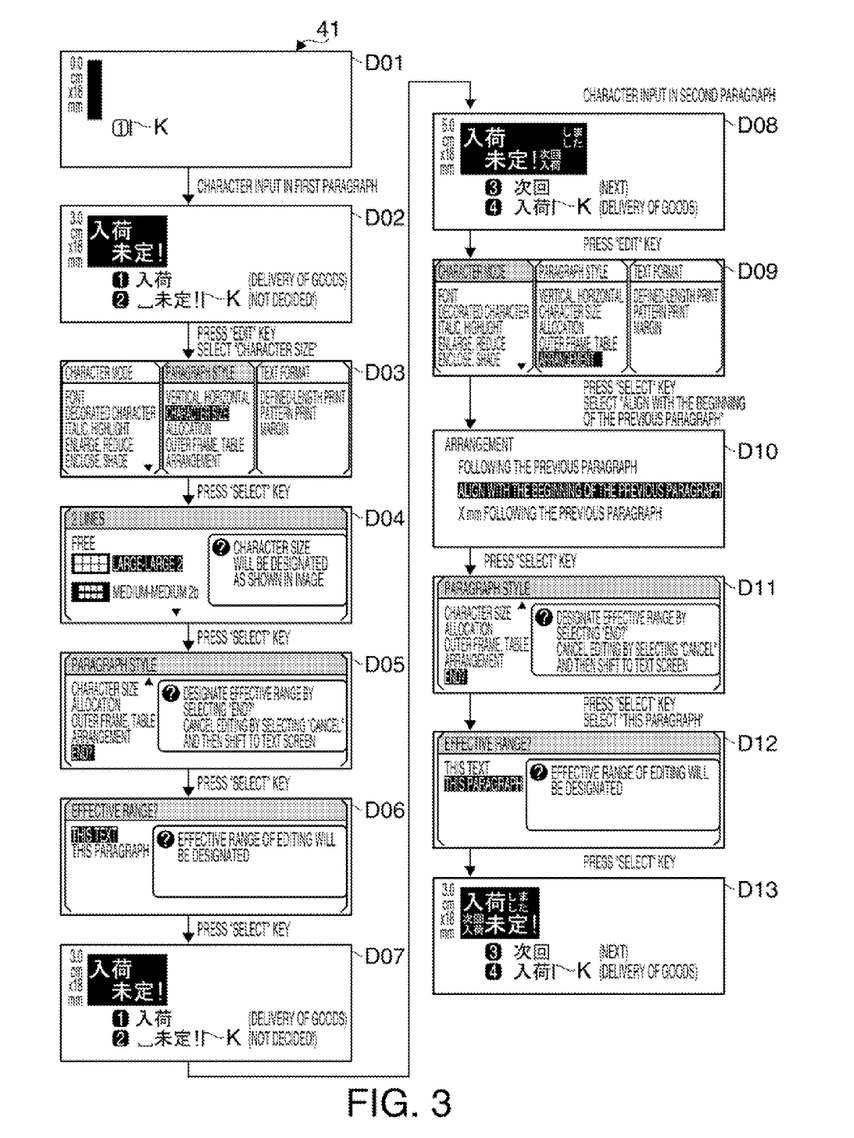
FIG. 3 is a screen transition view showing operations from the creation of a paragraph to the decision of an arrangement.

A screen D02 shows a state where characters of the first paragraph are inputted. Here, it is assumed that "入 荷" (delivery of goods) is inputted in the first line and "□未定" (not decided) is inputted in the second line ("□" meaning a fullwidth space). If the "edit" key is pressed in the screen D02, an editing screen (screen D03) is displayed. In the editing screen, plural editing items are prepared for each of character mode, paragraph style and text format, and one of these items can be selected. Here, it is assumed that an item "character size" for paragraph style is selected. If the "select" key is pressed in the state where the item "character size" is highlighted, since the number of lines in the first paragraph is two, a screen D04 for selecting a character size in the case of a two-line paragraph is displayed.

In the screen D04, a character size for each line can be selected from plural options. For example, if "free" is selected, a character size designated for each line is employed. If "large-large 2*a*" is selected, a character size "Large (for example, 19 points)" is employed for both of the two lines. If "medium-medium 2*b*" is selected, a character size "medium (for example, 16 points)" is employed for both of the two lines. There also are options such as "large-small 2*c*", "small-large 2*d*" and the like, which are not described in detail.

Figure 4A:
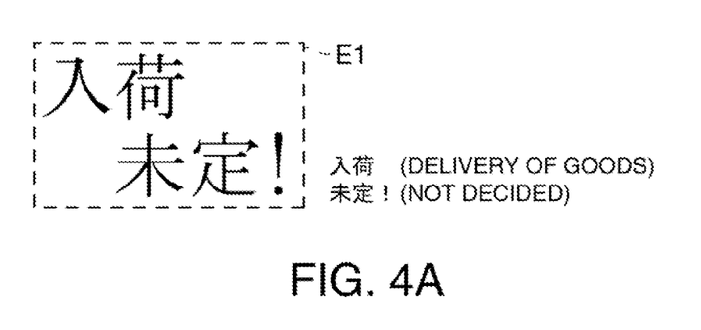
FIG. 4A to FIG. 4C are explanatory views showing the result of creating a paragraph and the result of printing the paragraph.

If the default value "large-large 2a" is selected in the screen D04, a screen D05 for selecting an item for paragraph style is displayed. Here, if an item "end?" meaning the end of the editing of the paragraph style is selected, a screen D06 for selecting an effective range of the editing content is displayed. Here, either "this text" or "this paragraph" can be selected. For example, if "this text" is selected, the editing content is then reflected on the entire text. If "this paragraph" is selected, the editing content is reflected only on the corresponding paragraph (the paragraph in which the cursor K is located). If "this text" is selected in the screen D06, a text input screen (screen D07, similar to the screen D02) is displayed. Although the case where "this text" is selected is shown in the screen D06, this is the editing of the first paragraph and therefore the selection of "this paragraph" has the same result. If "this text" is selected in the case where plural paragraph exist, the quantity of feeding can be set en bloc for the text. The print data of the first paragraph (print area E1 based on the print data) created by the above operation (paragraph creating unit) is as shown in FIG. 4A.

Figure 4B:
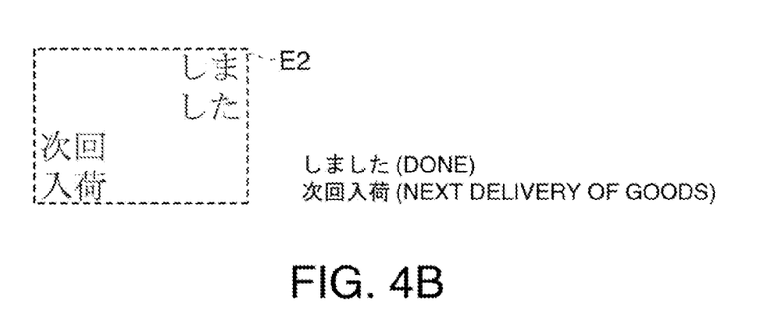

A screen D08 shows the state where characters in the second paragraph are inputted. Here, it is assumed that, as the second paragraph, "□□□□しま" in the first line, "□□□□ した" in the second line (the first and second lines meaning "done"), "次回" (next) in the third line, and "入荷" (delivery of goods) in the fourth line are inputted. In the case of a four-line paragraph, the default character size is set. The print data of the second paragraph (print area E2 based on the print data) created by the above operation is as shown in FIG. 4B. The length in the direction of the tape width, of the print area E based on the print data of the paragraph, is univocally defined by the tape width (the result of detection by the tape identification sensors 27). Therefore, "the length of the print area E1 in the direction of the tape width*=the length of the print area E2 in the direction of the tape width" holds. Thus, the user can be saved from the operation of designation, and even when plural paragraphs are arranged on one label L, the poor appearance due to the different heights of the paragraphs can be overcome.

If the "edit" key is pressed in the screen D08, an editing screen (screen D09) is displayed. If an item "arrangement" for paragraph style is selected in the screen D09, an arrangement selection screen (screen D10) for selecting a paragraph arrangement is displayed (feeding quantity setting unit). In the screen D10, one of three options "following the previous paragraph", "align with the beginning of the previous paragraph", and "X mm following the previous paragraph" can be selected. The arrangement of paragraphs in the case where each option is selected will be described in detail later. Here, it is assumed that the option "align with the beginning of the previous paragraph" is selected.

Figure 4C:
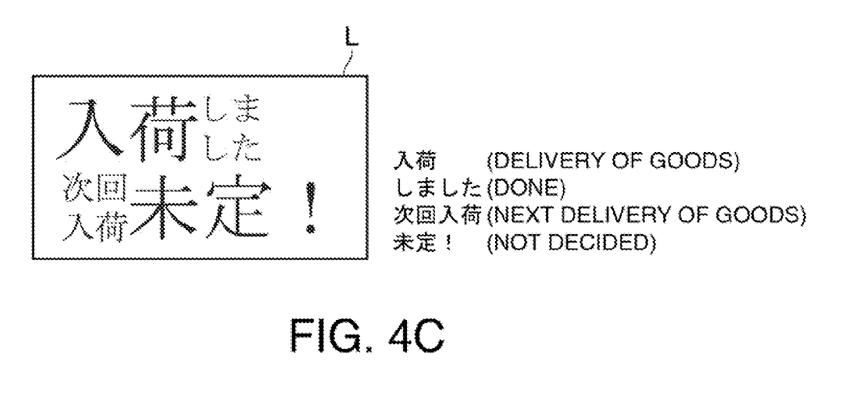

If the "select" key is pressed in the screen D10, a screen D11 (similar to D05) for selecting an item for paragraph style is displayed. If the "select" key is then pressed, a screen D12 (similar to screen D06) for selecting an effective range of the editing content is displayed. If "this paragraph" is selected in the screen D12, the setting of the paragraph arrangement is reflected on the second paragraph and the screen returns to the text input screen (screen D13). In this screen D13, the content of the text display area is the same as in the screen D08, but the display of the preview area is different. That is, the first paragraph and the second paragraph are superimposed and combined in the state where the beginning of the second paragraph and the beginning of the first paragraph are aligned. The result of printing in the case where the "print" key is pressed in the screen D13 is as shown in FIG. 4C.

Next, the result of printing in the case where each option is selected in the arrangement selection screen (screen D10 in FIG. 3) will be described with reference to FIG. 5A to FIG. 5D. For example, if "following the previous paragraph" is selected in the arrangement selection screen, the starting position of the print area E2 of the second paragraph is placed at 0.5 mm (a predetermined amount) from the ending position of the print area E1 of the first paragraph (arrangement deciding unit). That is, the quantity of feeding between the paragraphs is 0.5 mm (see FIG. 5A). If "align with the beginning of the previous paragraph" is selected, the starting position of the print area E2 of the second paragraph is aligned with the starting position of the print area E1 of the first paragraph. That is, the quantity of feeding between the paragraphs is "−(the length L of the print area E1 in the longitudinal direction of the tape, with L being L>0)". The print area E1 of the first paragraph and the print area E2 of the second paragraph are aligned at the forward end and thus superimposed and combined (see FIG. 5B). In this case, the paragraph that is superimposed (the forward side or upper side) is transmissive in its ground part other than the characters when combined.

Figure 5A:
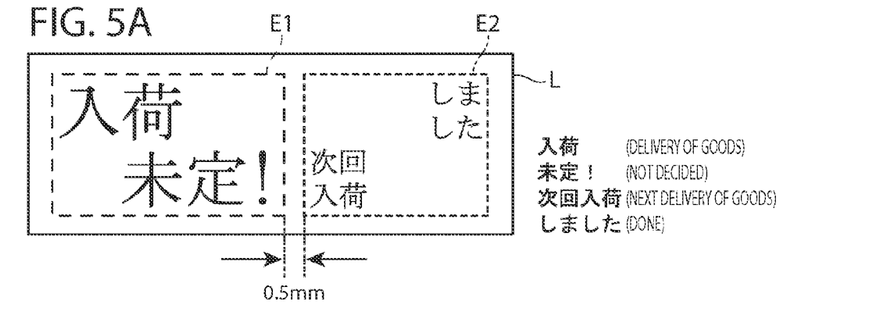
FIG. 5A to FIG. 5D are explanatory views showing an example of setting the quantity of feeding for a paragraph and the result of printing the paragraph.
Figure 5B:
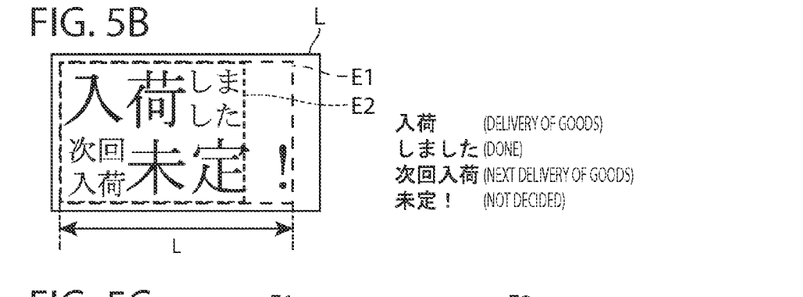
Figure 5C:
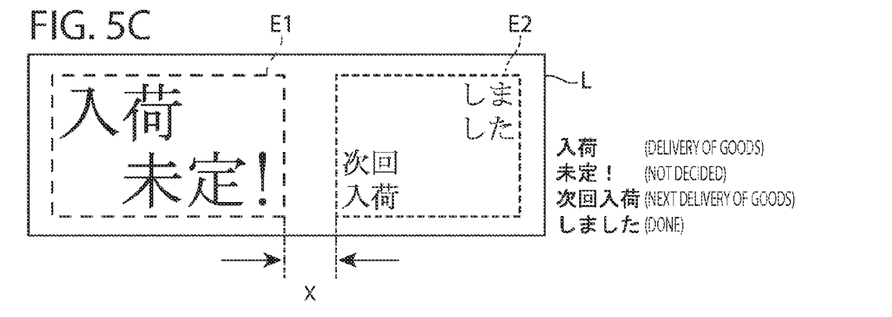
Figure 5D:
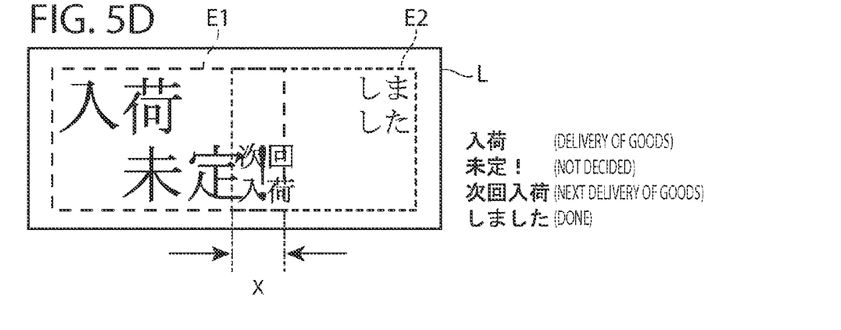

If "X mm following the previous paragraph" is selected, the starting position of the print area E2 of the second paragraph is placed at X mm from the ending position of the print area E1 of the first paragraph. That is, the quantity of feeding between the paragraphs is X (see FIG. 5C). X can be set at values including negative values and 0. That is, positive numbers, 0, and negative numbers can be set as the value of X. The result of printing in the case where a negative number (where −L<x<0 holds) is set as the value of X is as shown in FIG. 5D. That is, in the case where a negative value is set as the value of X, the latter half of the first paragraph and the former half of the second paragraph are partly superimposed and combined.

Since the tape length is displayed on the display screen 41 as in D07 shown in FIG. 3, the value of X may be designated utilizing this tape length. For example, in the case where a forward margin and a rear margin of 3 mm each are provided before and after the label L and the result of printing shown in FIG. 5B is to be acquired, subtracting the length 3 mm of the forward margin from the displayed length 3.0 cm results in 27 mm and therefore "−27" may be designated as the value of X.

Figure 6:
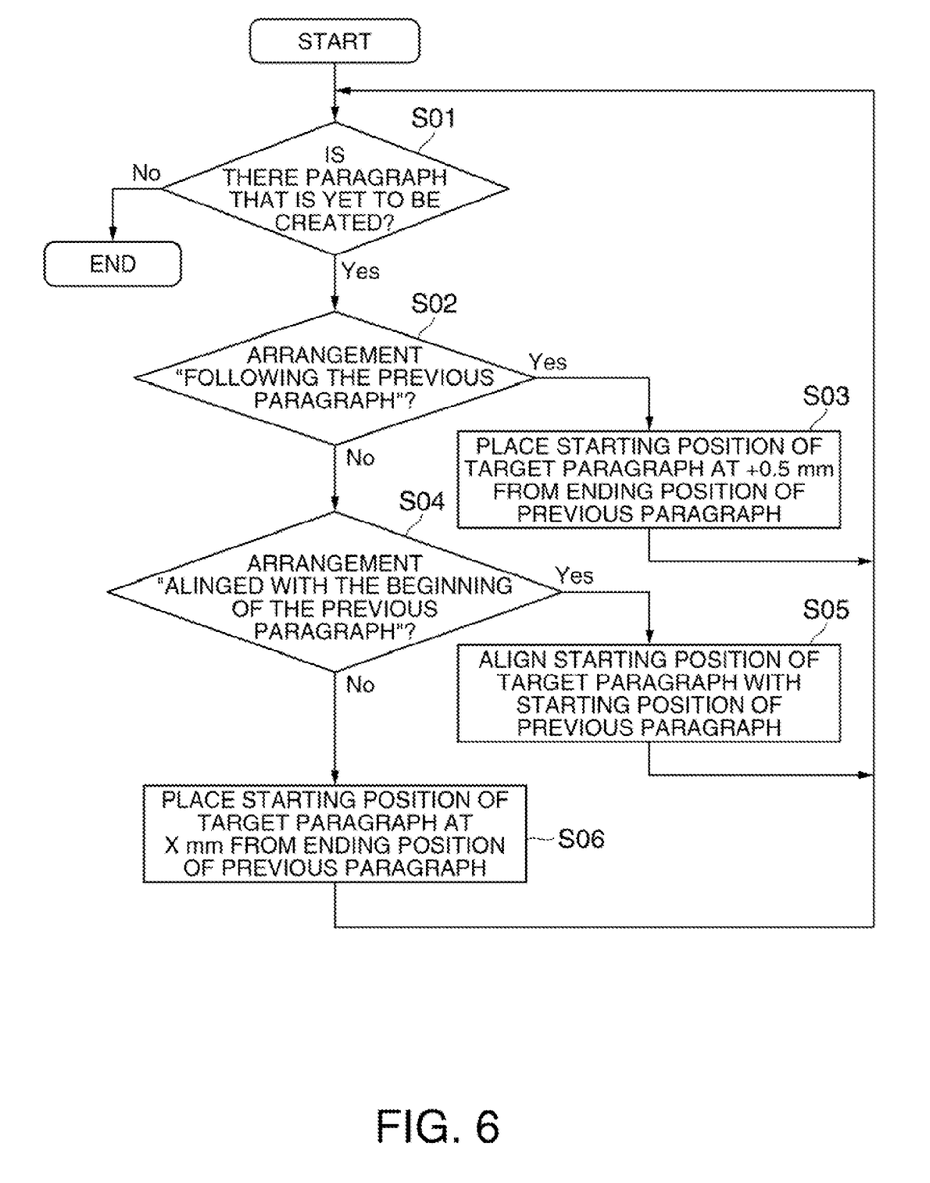
FIG. 6 is a flowchart showing paragraph arrangement decision by the tape printing apparatus.

Next, the flow of the paragraph arrangement decision processing by the tape printing apparatus 1 will be described with reference to the flowchart of FIG. 6. The tape printing apparatus 1 (CPU 110) determines whether there is a paragraph that is yet to be created or not. If there is no paragraph that is yet to be created (No in S01), the processing ends. If there is a paragraph that is yet to be created (Yes in S01), whether the option "following the previous paragraph" is selected or not is determined in the arrangement selection screen (screen D10 shown in FIG. 3) (S02). Here, if the result is Yes in S02, the starting position of the target paragraph is placed at +0.5 mm from the ending position of the paragraph that is immediately before the target paragraph (hereinafter referred to as "previous paragraph") (S03, see FIG. 5A).

If the result of No in S02, whether the option "align with the beginning of the previous paragraph" is selected or not is determined (S04). Here, if the result is Yes in S04, the starting position of the target paragraph is aligned with the starting position of the previous paragraph (S05, see FIG. 5B). If the result is No in S04 (that is, if the option "X mm following the previous paragraph" is selected), the starting position of the target paragraph is placed at X mm from the ending position of the previous paragraph (S06, see FIG. 5C and FIG. 5D). After S03, S05 and S06, the processing returns to S01.

As described above, with the tape printing apparatus 1 according to the embodiment, the quantity of feeding between paragraphs can be set in accordance with the user's preference. Therefore, the degree of freedom for the arrangement of each paragraph on the label L can be enhanced. Thus, a label L having variety can be created and hence results desired by the user can be provided.

Since the quantity of feeding can be set for each paragraph, a label L having further variety with different quantities of feeding for individual paragraphs can be created. Moreover, since the quantity of feeding can be set at a negative value, a label L on which two or more paragraphs are superimposed and combined can be created.

The options for setting the quantity of feeding include "the first option to align and superimpose the starting position of an arbitrary paragraph with the starting position of the paragraph that is created immediately before that paragraph, that is, to align the starting position of the arbitrary paragraph with the beginning of the previous paragraph". Therefore, the user need not carry out any work such as calculating the quantity of feeding and can easily combine an arbitrary paragraph and the paragraph that is created immediately before that paragraph. Moreover, the options include "the second option to arrange the starting position of an arbitrary paragraph at a position away by a predetermined amount from the ending position of the paragraph that is created immediately before that paragraph, that is, following the previous paragraph". Therefore, paragraphs can be arranged at equal spacing in the longitudinal direction of the tape T and a label L with good appearance can be created.

In the embodiment, the negative value of X is limited within the range of $-L<x<0$. However, it is also possible to set a value $X\leq-L$. In this case, the arrangement of an N-th paragraph is decided in such a manner that the N-th paragraph is superimposed on at least one of (N−1) paragraphs that are created before the N-th paragraph.

In the embodiment, the quantity of feeding is set in millimeters. However, the quantity of feeding may also be set in inches or in dots. With this configuration, paragraph spacing on the label L can be easily estimated.

The quantity of feeding may also be set in the number of characters. With this configuration, since the quantity of feeding can be set in the number of characters, the setting in the case of superimposing and combining two paragraphs can be easily carried out. The number of characters may be the number of fullwidth characters or the number of halfwidth characters. The setting of the quantity of feeding may also include character size. Specifically, the setting of one fullwidth character with a character size "large", two halfwidth characters with a character size "medium", and the like can be considered. For example, in the case of aligning the beginning of the second paragraph with the beginning of the first paragraph, as shown in FIG. 5B, the quantity of feeding of the second paragraph may be "−(four fullwidth characters with a character size "large")".

In the embodiment, the quantity of feeding between a target paragraph and the previous paragraph is set. However, the quantity of feeding between a target paragraph and the paragraph that is immediately after that target paragraph can also be set.

In the embodiment, in the case where the option "X mm following the previous paragraph" is selected, the starting position of the target paragraph is placed at X mm from the ending position of the previous paragraph. However, the starting position of the previous paragraph may be used as the reference position, instead of the ending position of the previous paragraph. For example, in the case of aligning the beginning of the second paragraph with the beginning of the first paragraph, as shown in FIG. 5B, the quantity of feeding of the second paragraph may be 0 mm. In the case of the arrangement shown in FIG. 5A, the quantity of feeding may be "the length of the first paragraph in the longitudinal direction of the tape+0.5 mm".

In the embodiment, the case of combining two paragraphs is described as an example, as shown in FIG. 5B and FIG. 5D. However, it is also possible to combine three or more paragraphs.

The components of the tape printing apparatus 1 described in the embodiment can be provided as a program. Also, the program stored in various recording media (CD-ROM, flash memory and so on) can be provided. That is, a program which causes a computer to function as each unit of the tape printing apparatus 1, and a recording medium in which this program is recorded should also be included in the scope of right of the invention. Moreover, various changes and modifications can be made without departing from the scope of the invention.

For example, this invention can be used for a tape printer connected to a personal computer, the personal computer can remotely control the tape printer.

The entire disclosure of Japanese Patent Application No. 2010-65868, filed Mar. 23, 2010 is expressly incorporated by reference herein.

What is claimed is:

1. A tape printing apparatus capable of printing plural paragraphs arrayed in a longitudinal direction of a tape, with each paragraph including one or more lines, the apparatus comprising:
    a paragraph creating unit which creates the paragraphs;
    a feeding quantity setting unit which sets a quantity of feeding between the paragraphs in the longitudinal direction of the tape, a positive quantity of feeding corresponding to a quantity of tape fed in the longitudinal direction and a negative quantity of feeding corresponding to a quantity of tape fed in a direction opposite the longitudinal direction;
    an arrangement deciding unit which decides an arrangement of each paragraph on the basis of the setting by the feeding quantity setting unit; and
    a printing unit which prints each paragraph created by the paragraph creating unit on the tape in a manner that realizes the arrangement decided by the arrangement deciding unit,
    wherein:
        when the quantity of feeding is set at the positive value, the arrangement deciding unit decides a starting position of a print area of a subsequent paragraph such as to be spaced apart from a print area of a previous paragraph created directly before the subsequent area, and
        when the quantity of feeding is set at the negative value, the arrangement deciding unit decides the starting position of the print area of the subsequent paragraph such as to be disposed within the print area of the previous paragraph or at the starting position of the print area of the previous paragraph.

2. The tape printing apparatus according to claim 1, wherein the feeding quantity setting unit can set the quantity of feeding by selecting one of plural options, and
    the options include a first option to align and superimpose a starting position of the subsequent paragraph to a starting position of a paragraph that is created immediately before the subsequent paragraph.

3. The tape printing apparatus according to claim 2, wherein the options include a second option to arrange the starting position of the subsequent paragraph at a position that is away by a predetermined amount from a starting position or an ending position of a paragraph that is created immediately before the subsequent paragraph.

4. The tape printing apparatus according to claim 1, wherein the feeding quantity setting unit can set the quantity of feeding in one of millimeters, inches, the number of dots, and the number of characters.

5. The tape printing apparatus according to claim 1, wherein each paragraph created by the paragraph creating unit has a uniform length in a direction of width of the tape after printing.

6. A paragraph arrangement deciding method for a tape printing apparatus capable of printing plural paragraphs arrayed in a longitudinal direction of a tape, with each paragraph including one or more lines, the method comprising:
   creating the paragraphs;
   setting a quantity of feeding between the paragraphs in the longitudinal direction of the tape, a positive quantity of feeding corresponding to a quantity of tape fed in the longitudinal direction and a negative quantity of feeding corresponding to a quantity of tape fed in a direction opposite the longitudinal direction; and
   deciding an arrangement of each paragraph on the basis of the quantity of feeding that is set,
   wherein:
      when the quantity of feeding is set at the positive value, a starting position of a print area of a subsequent paragraph is decided such as to be spaced apart from a print area of a previous paragraph created directly before the subsequent area, and
      when the quantity of feeding is set at the negative value, a starting position of a print area of a subsequent paragraph is decided such as to be disposed within the print area of the previous paragraph or at the starting position of the print area of the previous paragraph.

7. A program stored on a non-transitory storage medium, the program causing a computer to execute each operation of the paragraph arrangement deciding method for the tape printing apparatus according to claim 6.

8. The tape printing apparatus according to claim 1, wherein:
   in the case where the quantity of feeding is set at the negative value for a subsequent paragraph created secondly or later, the arrangement deciding unit decides the arrangement of the subsequent paragraph in a manner that the subsequent paragraph is superimposed on at least one paragraph of one or more paragraphs that are created before the subsequent paragraph.

\* \* \* \* \*